United States Patent
Kondoh

(10) Patent No.: US 7,510,344 B2
(45) Date of Patent: Mar. 31, 2009

(54) JOINT STRUCTURE OF BALL JOINT AND ARM

(75) Inventor: Yasuhiro Kondoh, Toyohashi (JP)

(73) Assignee: Usashi Seimitsu Kogyo Kabushiki, Aichi-Ken (JP)

( * ) Notice: Subject to any disclaimer, the term of this patent is extended or adjusted under 35 U.S.C. 154(b) by 0 days.

(21) Appl. No.: 11/377,606

(22) Filed: Mar. 16, 2006

(65) Prior Publication Data
US 2006/0188324 A1 Aug. 24, 2006

Related U.S. Application Data

(62) Division of application No. 10/499,592, filed as application No. PCT/JP01/11396 on Dec. 25, 2001, now abandoned.

(51) Int. Cl.
*F16C 11/08* (2006.01)

(52) U.S. Cl. ..................................... 403/135

(58) Field of Classification Search ................ 403/122, 403/134, 414, 142, 143, 76, 329, 90, 133, 403/135, 129, 136, 138, 144, 114, 115, 123, 403/141, 124, 125, 126, 127, 128, 130, 131; 280/93, 511, 93.511

See application file for complete search history.

(56) References Cited

U.S. PATENT DOCUMENTS

| | | | |
|---|---|---|---|
| 2,855,232 A | | 10/1958 | Kozak |
| 2,978,914 A | * | 4/1961 | Gut |
| 4,220,418 A | | 9/1980 | Kondo |
| 4,298,219 A | * | 11/1981 | Amelink |
| 4,483,569 A | * | 11/1984 | Smith |
| 4,650,362 A | | 3/1987 | Kubo |
| 4,966,488 A | * | 10/1990 | Mayhew ..................... 403/135 |
| 5,230,580 A | * | 7/1993 | Henkel ........................ 403/135 |
| 5,395,176 A | * | 3/1995 | Zivkovic ...................... 403/122 |

(Continued)

FOREIGN PATENT DOCUMENTS

DE 3 921 408 1/1990

(Continued)

OTHER PUBLICATIONS

Patent Abstracts of Japan of JP 10-103341 dated Apr. 21, 1998.

(Continued)

*Primary Examiner*—Daniel P Stodola
*Assistant Examiner*—Joshua T Kennedy
(74) *Attorney, Agent, or Firm*—Ladas and Parry LLP

(57) ABSTRACT

The invention is a joint structure of a ball joint and an arm, which includes: a ball stud having a spherical ball part and a shank part extending from the spherical ball part; a bearing cupping the spherical ball part of the ball stud; a housing holding the bearing therein; and an arm having a hole into which the housing is inserted. The housing has a circumferential groove in an outer-circumference surface thereof. The housing is adapted to be pressed into the hole of the arm. The groove functions to weaken a load by the arm after the housing is pressed into the hole of the arm. Thus, a pressure to the spherical ball part of the ball stud is inhibited so that a sliding characteristic of the ball stud is improved.

7 Claims, 10 Drawing Sheets

U.S. PATENT DOCUMENTS

| | | | |
|---|---|---|---|
| 5,839,845 A | | 11/1998 | Kincaid et al. |
| 6,010,272 A | | 1/2000 | Littman |
| 6,505,989 B1 | * | 1/2003 | Pazdirek et al. ............. 403/135 |
| 6,619,873 B2 | * | 9/2003 | Parker ........................ 403/135 |
| 6,719,476 B2 | * | 4/2004 | Hisi ...................... 280/93.511 |
| 7,037,023 B2 | * | 5/2006 | Monninghoff et al. ...... 403/122 |
| 2002/0192016 A1 | * | 12/2002 | Monninghoff et al. ...... 403/122 |

FOREIGN PATENT DOCUMENTS

| | | |
|---|---|---|
| JP | 59 24526 | 2/1984 |
| JP | 3 62222 | 6/1991 |
| JP | 10-103341 | 4/1998 |
| JP | 2002-31126 | 1/2002 |

OTHER PUBLICATIONS

Patent Abstracts of Japan of JP 2002-31126 dated Jan. 31, 2002.

* cited by examiner

JOINT STRUCTURE OF BALL JOINT AND ARM

This application is a divisional of now abandoned application number 10/499,592 filed on Jun. 18, 2004, which is International Application PCT/JP2001/11396 filed on 25 Dec. 2001, which designated the U.S., claims the benefit thereof and incorporates the same by reference.

TECHNICAL FIELD

The present invention relates to a joint structure of a ball joint and an arm, which is used in a suspension system and a steering system and the like of for example an automobile.

BACKGROUND ART

Conventionally, as a joint in a suspension system and a steering system of an automobile, a ball joint and an arm are often jointed. A conventional example of joint structure of a ball joint and an arm is shown in FIG. 10.

The ball joint 101 shown in FIG. 10 includes: a ball stud 102 having a spherical ball part 104 and a shank part 103 extending from the spherical ball part 104; a bearing 105 made of a synthetic resin, cupping the spherical ball part 104 of the ball stud 102 in such a manner that the spherical ball part 104 is able to turn and rock therein, and having an open part 106 in one end; a housing 107 holding the bearing 105 therein and having a small open part 108 in one end through which the shank part 103 of the ball stud 102 projects and a large open part 109 in the other end; a closing plate 112 fixed to an end portion of the large open part 109 of the housing 107 by caulking; and a dust cover 114 having a dust-cover small open part 115 fitted on the shank part 103 of the ball stud 102 and a dust-cover large open part 116 fitted on the housing 107. Then, the housing 107 of the ball joint 101 is pressed into a hole 120 of an arm 119, so that the arm 119 and the other parts are jointed.

The outer diameter of the housing 107 of the above ball joint 101 is formed to be a little larger than the inner diameter of the hole 120 of the arm 119. Then, when the housing 107 of the ball joint 101 is pressed into the hole 120 of the arm 119, the ball joint 101 and the arm 119 are jointed.

In the joint structure of the ball joint 101 and the arm 119 shown in FIG. 10, the outer diameter of the housing 107 of the ball joint 101 is formed to be a little larger than the inner diameter of the hole 120 of the arm 119. Thus, when the housing 107 is pressed into the hole 120 of the arm 119, the housing 107 receives a pressure from the hole 120 of the arm 119, so that the ball joint 101 is held in the hole 120 of the arm 119.

However, in the joint structure shown in FIG. 10, the press-fitting load given from the hole 120 of the arm 119 to the housing 107 may be also given to the spherical ball part 104 of the ball stud 102 from the housing 107 through the bearing 105. Thus, an operational torque necessary for rocking the ball stud 102 may undesirably become higher than a predetermined value.

DISCLOSURE OF THE INVENTION

Accordingly, it is an object of the present invention to solve the aforesaid problems and to provide a joint structure of a ball joint and an arm wherein an operational torque necessary for rocking a ball stud is reduced.

This invention is a joint structure comprising: a ball stud having a spherical ball part and a shank part extending from the spherical ball part; a bearing cupping the spherical ball part of the ball stud; a housing holding the bearing therein; and an arm having a hole into which the housing is inserted; wherein the housing has a circumferential groove in an outer-circumference surface thereof; the housing is adapted to be pressed into the hole of the arm; and the groove functions to weaken a load by the arm after the housing is pressed into the hole of the arm.

According to the invention, since the groove of the housing effectively weakens the press-fitting load from the hole of the arm, a pressure to the spherical ball part of the ball stud is inhibited so that a sliding characteristic of the ball stud is improved.

Preferably, the groove is formed at a position corresponding to an equatorial plane including a center of the spherical ball part. In the case, the press-fitting load from the hole of the arm is weakened very effectively.

Alternatively, the housing may have two circumferential grooves in the outer-circumference surface thereof. In the case, preferably, the two grooves may be formed in such a manner that an equatorial plane including a center of the spherical ball part is sandwiched between the two grooves. In the case too, the press-fitting load from the hole of the arm is weakened very effectively.

In addition, the invention is a joint structure comprising: a ball stud having a spherical ball part and a shank part extending from the spherical ball part; a bearing cupping the spherical ball part of the ball stud; a housing holding the bearing therein; and an arm having a hole into which the housing is inserted; wherein the hole has a circumferential groove in an inner-circumference surface thereof; the housing is adapted to be pressed into the hole of the arm; and the groove functions to weaken a load by the arm after the housing is pressed into the hole of the arm.

According to the invention, since the groove of the hole effectively weakens the press-fitting load, a pressure to the spherical ball part of the ball stud is inhibited so that a sliding characteristic of the ball stud is improved.

Preferably, the groove is formed at a position corresponding to an equatorial plane including a center of the spherical ball part. In the case, the press-fitting load from the hole of the arm is weakened very effectively.

Alternatively, the hole may have two circumferential grooves in the inner-circumference surface thereof. In the case, preferably, the two grooves may be formed in such a manner that an equatorial plane including a center of the spherical ball part is sandwiched between the two grooves. In the case too, the press-fitting load from the hole of the arm is weakened very effectively.

In addition, the invention is a joint structure comprising: a ball stud having a spherical ball part and a shank part extending from the spherical ball part; a bearing cupping the spherical ball part of the ball stud; a housing holding the bearing therein; and an arm having a hole into which the housing is inserted; wherein the housing has a first circumferential groove in an outer-circumference surface thereof; the hole has a second circumferential groove in an inner-circumference surface thereof; the housing is adapted to be pressed into the hole of the arm; and the first groove and the second groove function to weaken a load by the arm after the housing is pressed into the hole of the arm.

According to the invention, since the groove of the housing and the groove of the hole weaken the press-fitting load to the housing by the hole of the arm very effectively, a pressure to the spherical ball part of the ball stud is inhibited so that a sliding characteristic of the ball stud is improved.

Preferably, the first groove and the second groove are arranged to be opposite to each other.

In addition, when the outer-circumference surface of the housing is cylindrical and the inner-circumference surface of the hole is cylindrical, it is preferable that a retaining ring is arranged in the first groove and the second groove, the retaining ring having an inner diameter smaller than an outer diameter of the housing and an outer diameter larger than an inner diameter of the hole.

BEST MODE FOR CARRYING OUT THE INVENTION

Preferred embodiments of the present invention will be described hereinafter with reference to FIGS. 1 to 8.

Figure 1:
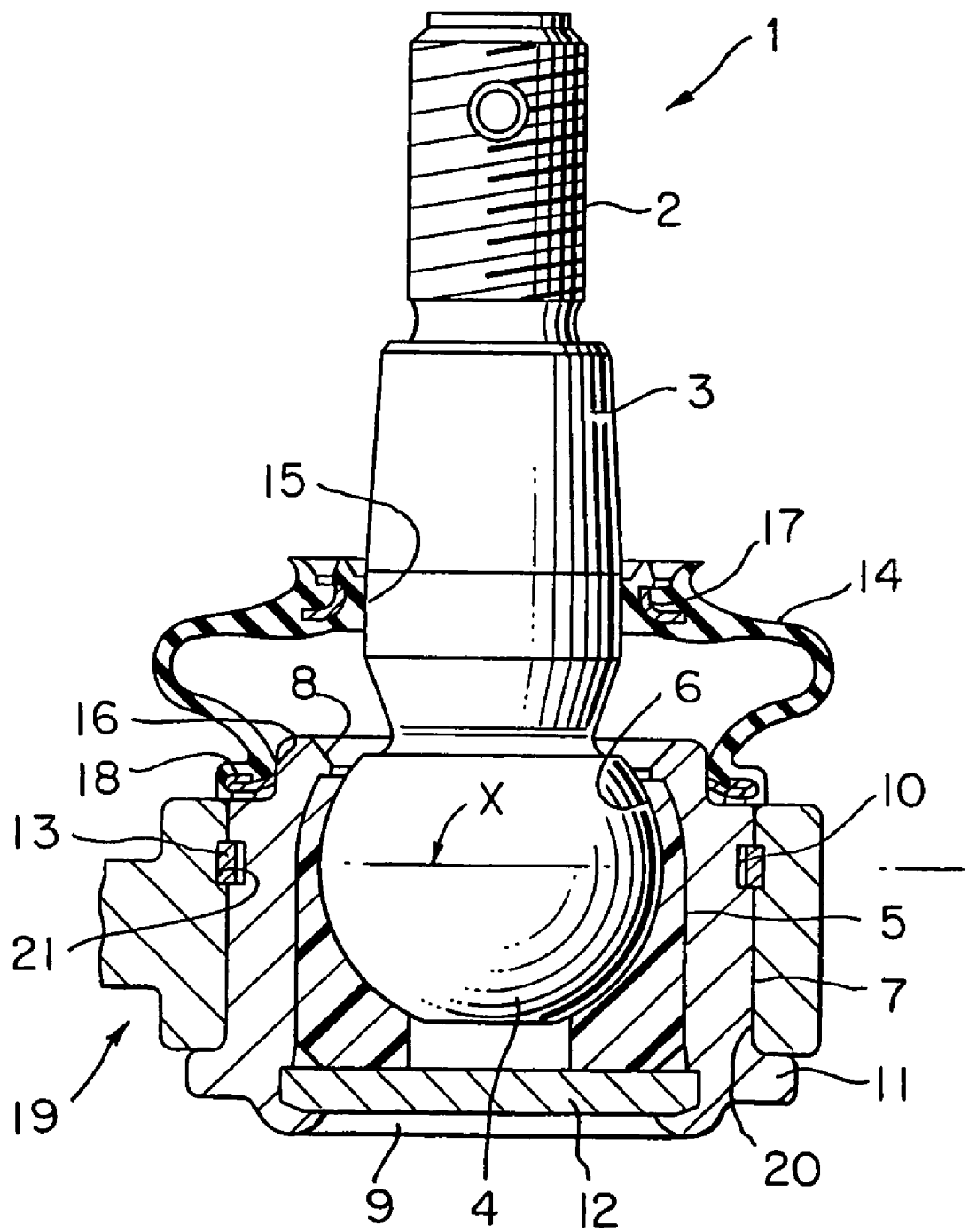
FIG. 1 is a partly sectional front elevation of a joint structure of a ball joint and an arm, according to a first embodiment of the present invention.

FIG. 1 shows a joint structure of a ball joint 1 and an arm 19 according to a first embodiment of the present invention. The ball joint 1 includes a ball stud 2 having a spherical ball part 4 and a shank part 3 projecting from the spherical ball part 4. A bearing 5 cups the spherical ball part 4 of the ball stud 2 in such a manner that the spherical ball part 4 is able to rock and turn therein. The bearing 5 has an open part 6 in one end thereof to allow the shank part 3 to rock. The bearing 5 is made of for example a synthetic resin. The bearing 5 is cupped (housed) in a substantially cylindrical housing 7.

The housing 7 has a small open part 8 on one side, through which the shank part 3 of the ball stud 2 projects, and a large open part 9 on the other side, which is to be caulked to fix a disk-like closing plate 12 in an inner circumference thereof. In addition, a circumferential groove 10 is formed in an outer-circumference surface of the housing 7 crossing an equatorial plane X including a center of the spherical ball part 4 of the ball stud 2. In addition, a flange 11 is circumferentially formed at an outside periphery of the large open part 9 of the housing 7.

In addition, in FIG. 1, "14" represents a dust cover. A small open part 15 of the dist cover 14 internally provided with an L-shaped ring 17 having a substantially L-shaped cross section is fitted on an outside periphery of the shank part 3 of the ball stud 2, and a large open part 16 of the dust cover 14 internally provided with a press-fitting ring 18 is fitted on an outside periphery of the small open part 8 of the housing 7.

On the other hand, the arm 19 has a hole 20 into which the housing 7 is fitted. In the hole 20, a circumferential groove 21 is formed in an inner-circumference surface thereof crossing the equatorial plane X including a center of the spherical ball part 4 of the ball stud 2. Thus, the housing 7 of the ball joint 1 is press-fitted into the hole 20 in such a manner that the groove 21 of the hole 20 and the groove 10 of the housing 7 are opposite to each other.

Figure 2:
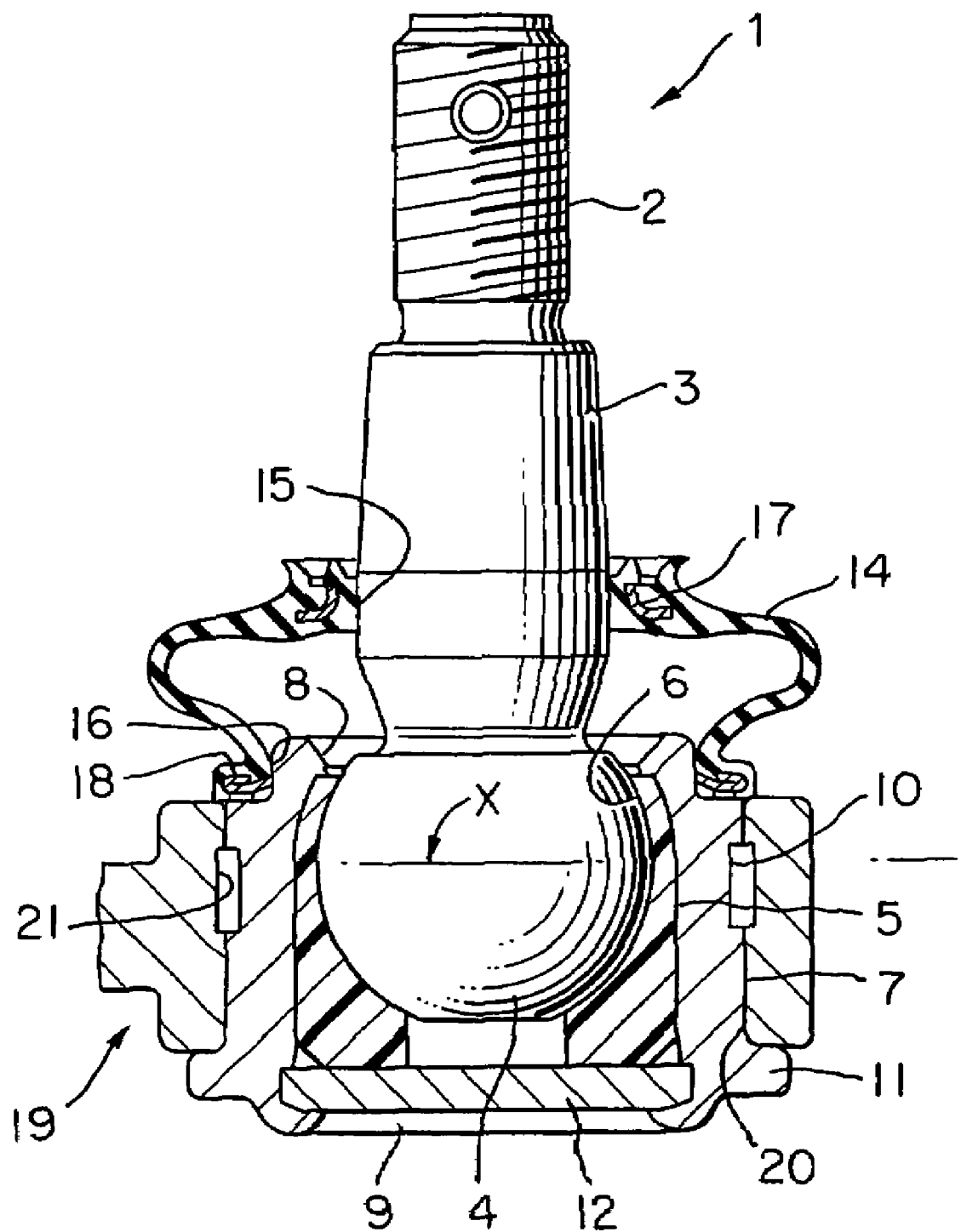
FIG. 2 is a partly sectional front elevation of a joint structure of a ball joint and an arm, wherein a retaining ring is omitted.

In the embodiment, a C-shaped retaining ring 13 in which one portion has been cut out is pressed into the groove 21 of the hole 20 and the groove 10 of the housing 7. Of course, as shown in FIG. 2, the retaining ring 13 may be omitted.

Next, a method of jointing the ball joint 1 and the arm 19 will be described with reference to FIGS. 3 to 7.

At first, a method of assembling the ball joint 1 will be described.

Figure 3:
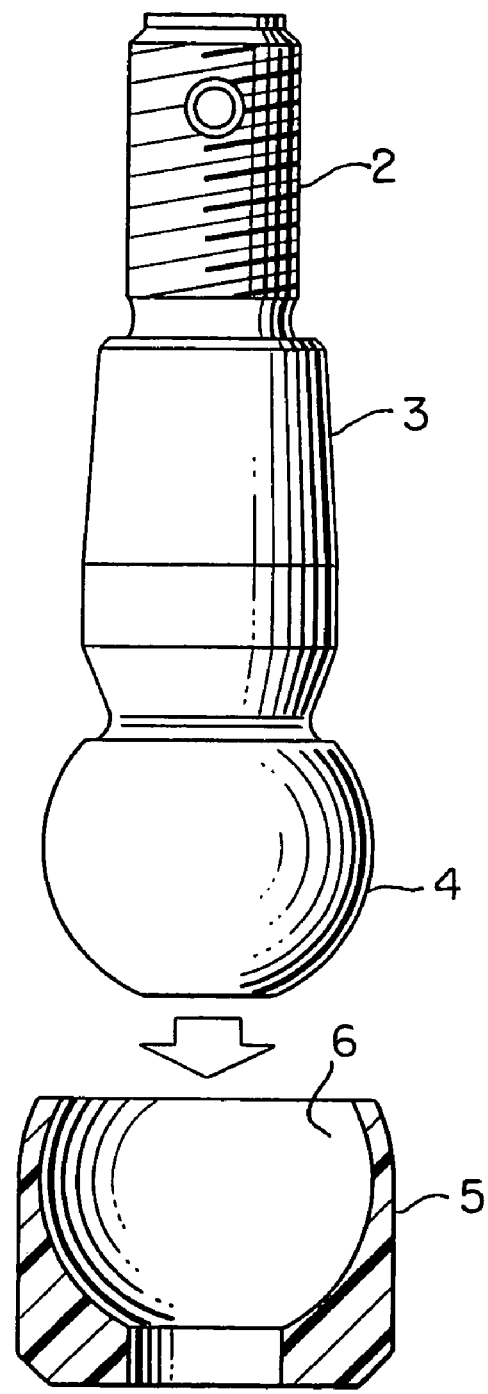
FIG. 3 is a partly sectional front elevation showing a first stage of work for assembling the ball joint shown in FIG. 1.
Figure 4:
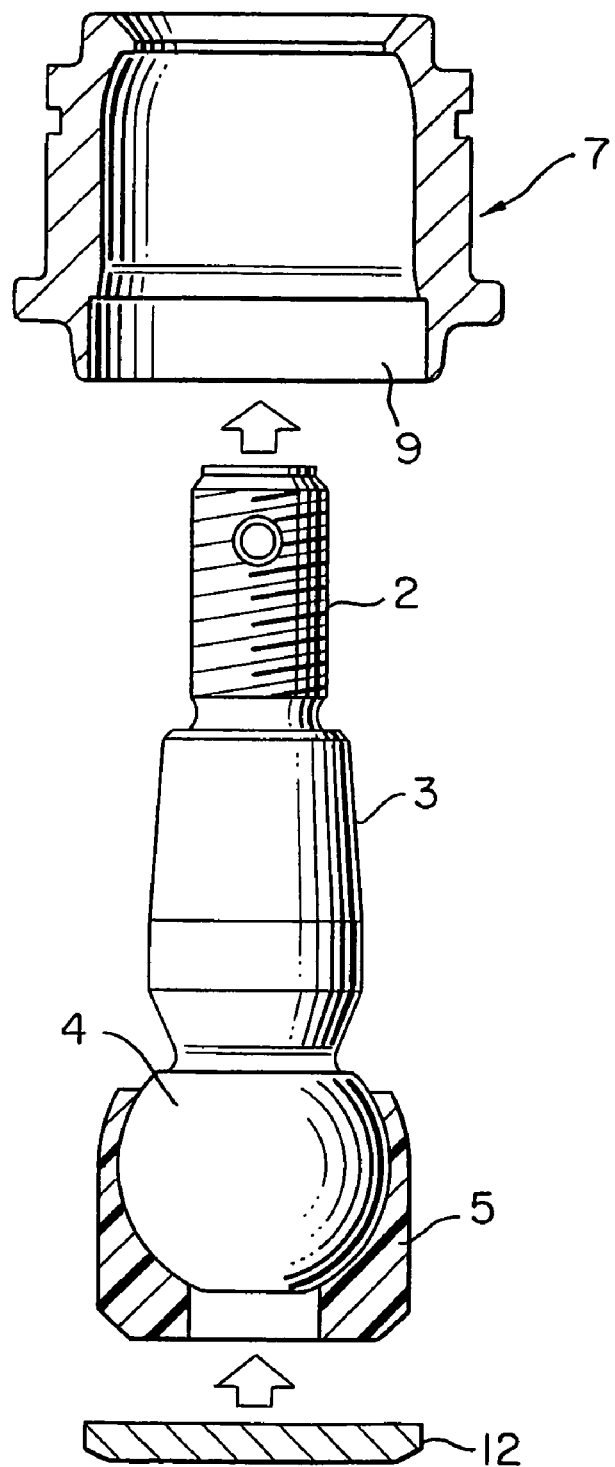
FIG. 4 is a partly sectional front elevation showing a second stage of work for assembling the ball joint shown in FIG. 1.
Figure 5:
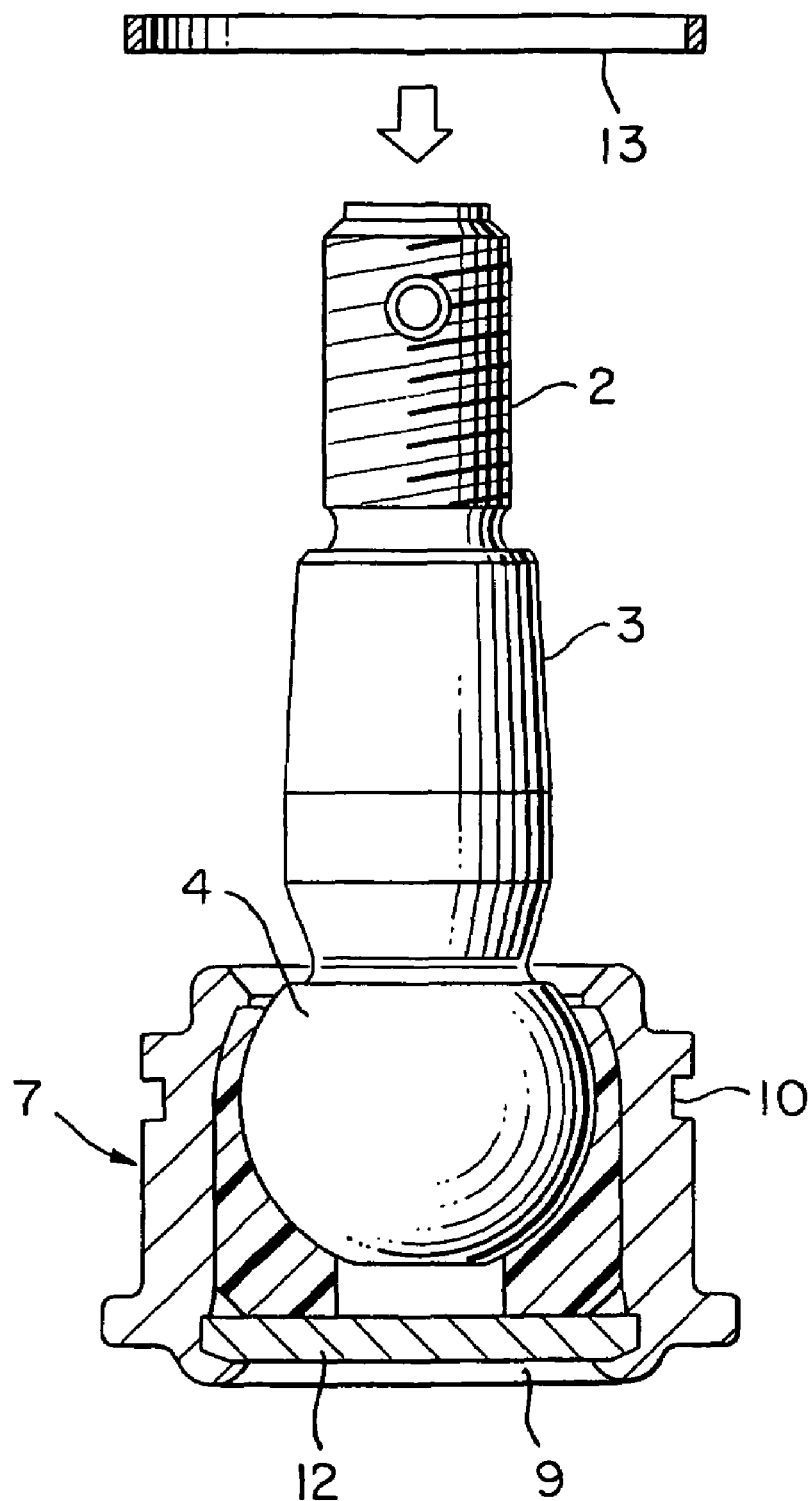
FIG. 5 is a partly sectional front elevation showing a third stage of work for assembling the ball joint shown in FIG. 1.
Figure 6:
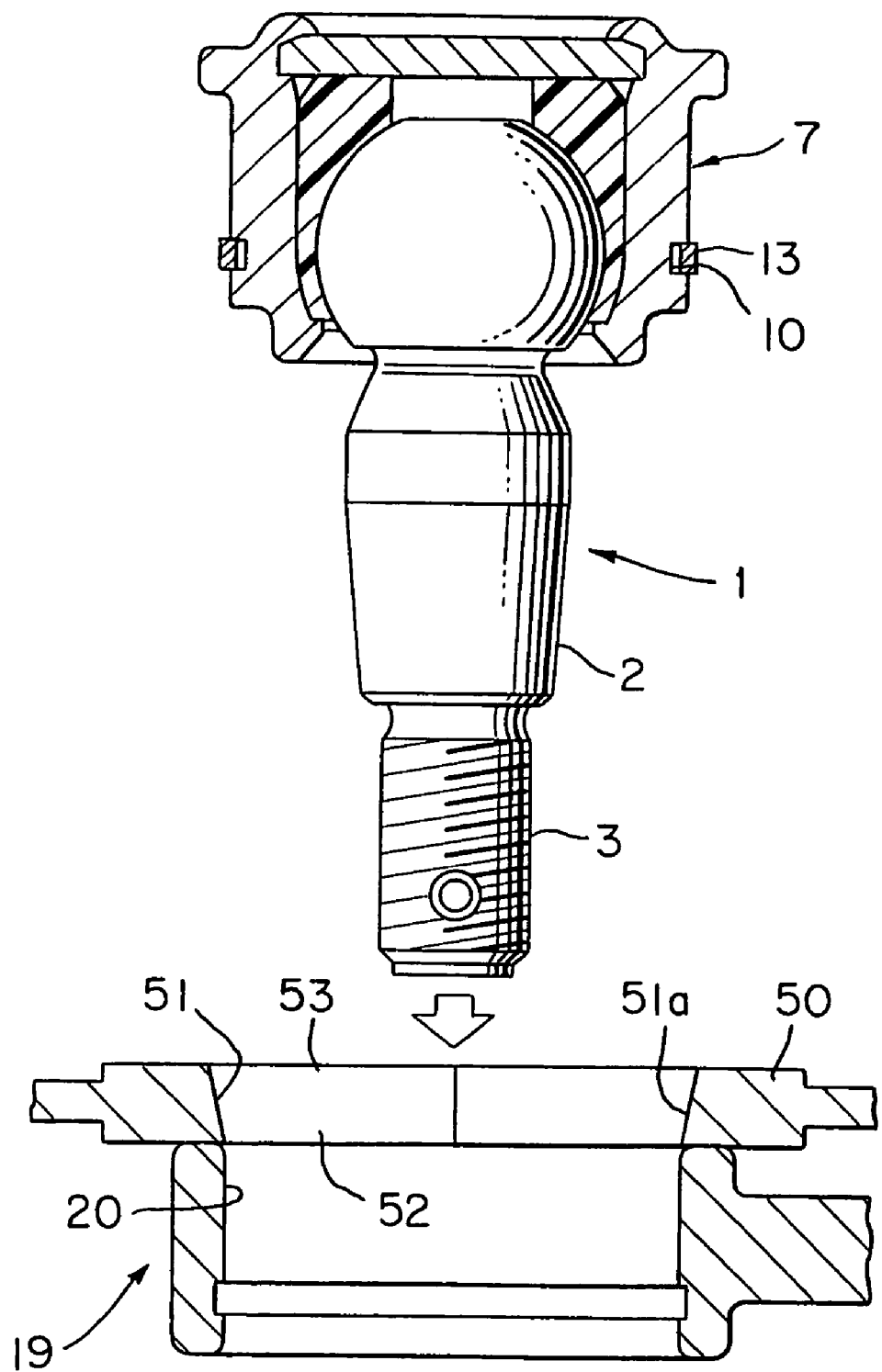
FIG. 6 is a partly sectional front elevation showing a first stage of work for jointing the ball joint shown in FIG. 1 and an arm.

At first, as shown in FIG. 3, the spherical ball part 4 of the ball stud 2 is inserted into the open part 6 of the bearing 5. Subsequently, as shown in FIG. 4, under the state wherein the bearing 5 is fitted on the spherical ball part 4 of the ball stud 2, the shank part 3 of the ball stud 2 is inserted into the large open part 9 of the housing 7. After the bearing 5 is arranged at a predetermined position in the housing 7, the closing plate 12 is inserted into the large open part 9 of the housing 7. Subsequently, as shown in FIG. 5, an end portion of the large open part 9 of the housing 7 is inward bent (caulked). Thus, the closing plate 12 is fixed. In addition, the retaining ring 13 is fitted in the groove 10 of the housing 7 through the side of the shank part 3 of the ball stud 2. The fitted retaining ring 13 projects a little outward from the groove 10 of the housing 7 of the ball joint 1, as shown in FIG. 6.

A method of press-fitting the ball joint 1 into the hole 20 of the arm 19 will be explained based on FIGS. 6 and 7. At first, as shown in FIG. 6, a jig 50 is abutted against an end surface on one side of the hole 20 of the arm 19. The jig 50 has a jig hole 51 consisting of: an one-side open end 52 having the same diameter as the hole 20 of the arm 19; a the-other-side open end 53 having a diameter larger than that of the one-side open end 52; and a taper surface 51a extending from the one-side open end 52 to the the-other-side open end 53.

The one-side open end 52 is aligned with an open end on one side of the hole 20 of the arm 19. Then, the shank part 3 of the ball stud 2 and housing 7 are pressed into the-other-side open end 53 of the jig hole 51 of the jig 50. As shown in FIG. 7, when the housing 7 of the ball joint 1 is pressed into the jig hole 51 of the jig 50, the retaining ring 13 fitted in the groove 10 of the housing 7 shrinks along the taper surface 51a of the jig 50. Under the state wherein the retaining ring 13 is caused to shrink to the same diameter as the inside diameter of the hole 20 of the arm 19 by the taper surface 51a, the retaining ring 13 is pressed into the hole 20 of the arm 19.

Figure 7:
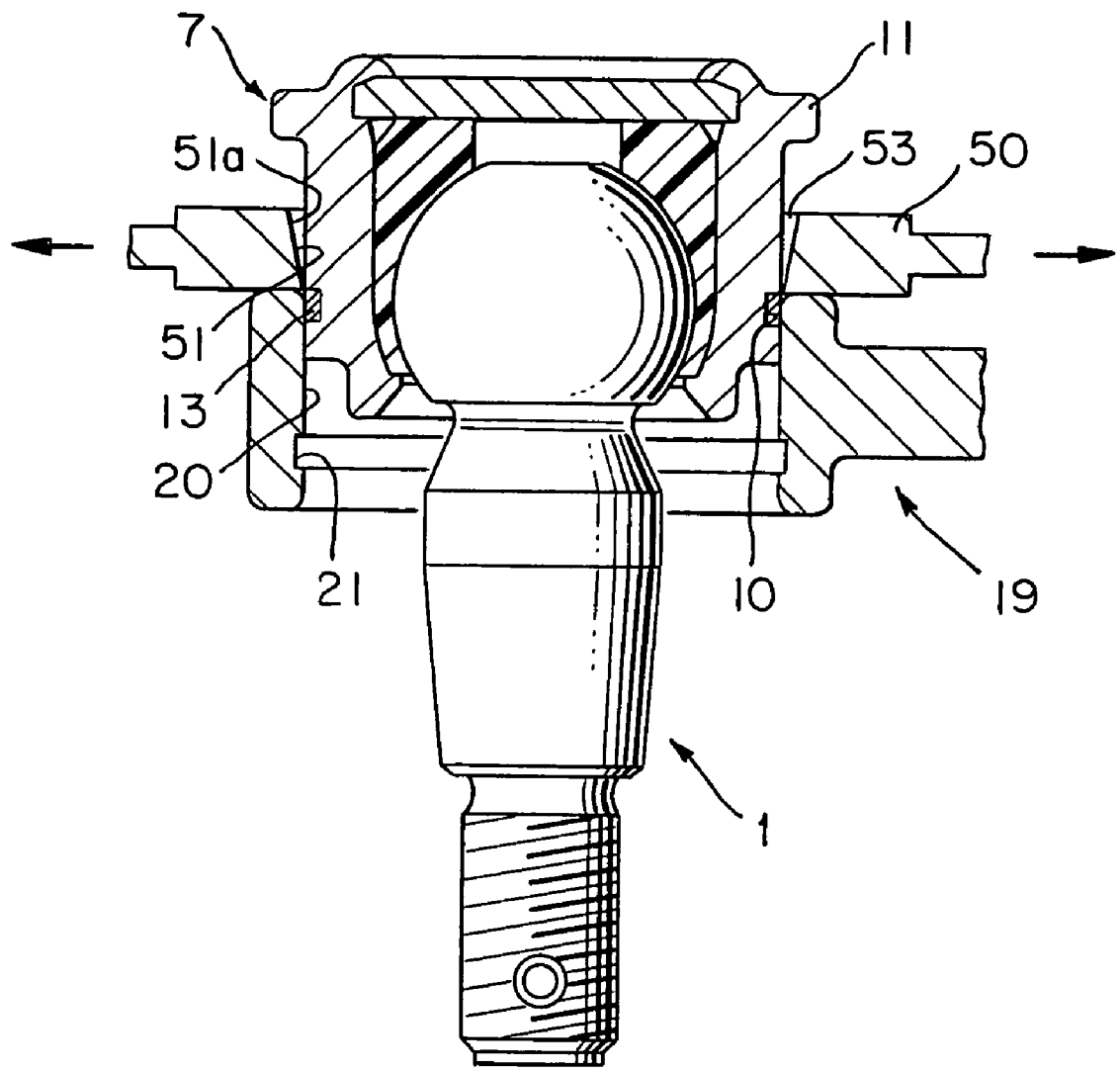
FIG. 7 is a partly sectional front elevation showing a second stage of work for jointing the ball joint shown in FIG. 1 and the arm.

Before the flange 11 of the housing 7 is abutted against the-other-side open end 53 of the jig hole 51, the jig 50 is divided into two parts, and the two parts move away from the arm 19 in respective directions shown by arrows in FIG. 7.

Next, when the groove 10 of the housing 7 reaches a position opposite to the groove 21 of the hole 20 of the arm 19, the retaining ring 13 that has been caused to shrink expands to an original state thereof. Thus, the retaining ring 13 extends both in the groove 10 of the housing 7 and in the groove 21 of the hole 20 of the arm 19, so that the ball joint 1 and the arm 19 are firmly jointed, as shown in FIG. 1.

In the joint structure of the ball joint 1 and the arm 19 of the embodiment, the groove 10 formed in the housing 7 of the ball joint 1 is located at the same level as the equatorial plane X including a center of the spherical ball part 4 of the ball stud 2. Thus, the groove 10 weakens the press-fitting load from the hole 20 of the arm 19 very effectively. Thus, a pressure given to the spherical ball part 4 of the ball stud 2 is inhibited so that a sliding characteristic of the ball stud 2 is improved. Specifically, an operational torque necessary for rocking the ball stud 2 can be reduced.

Figure 8:
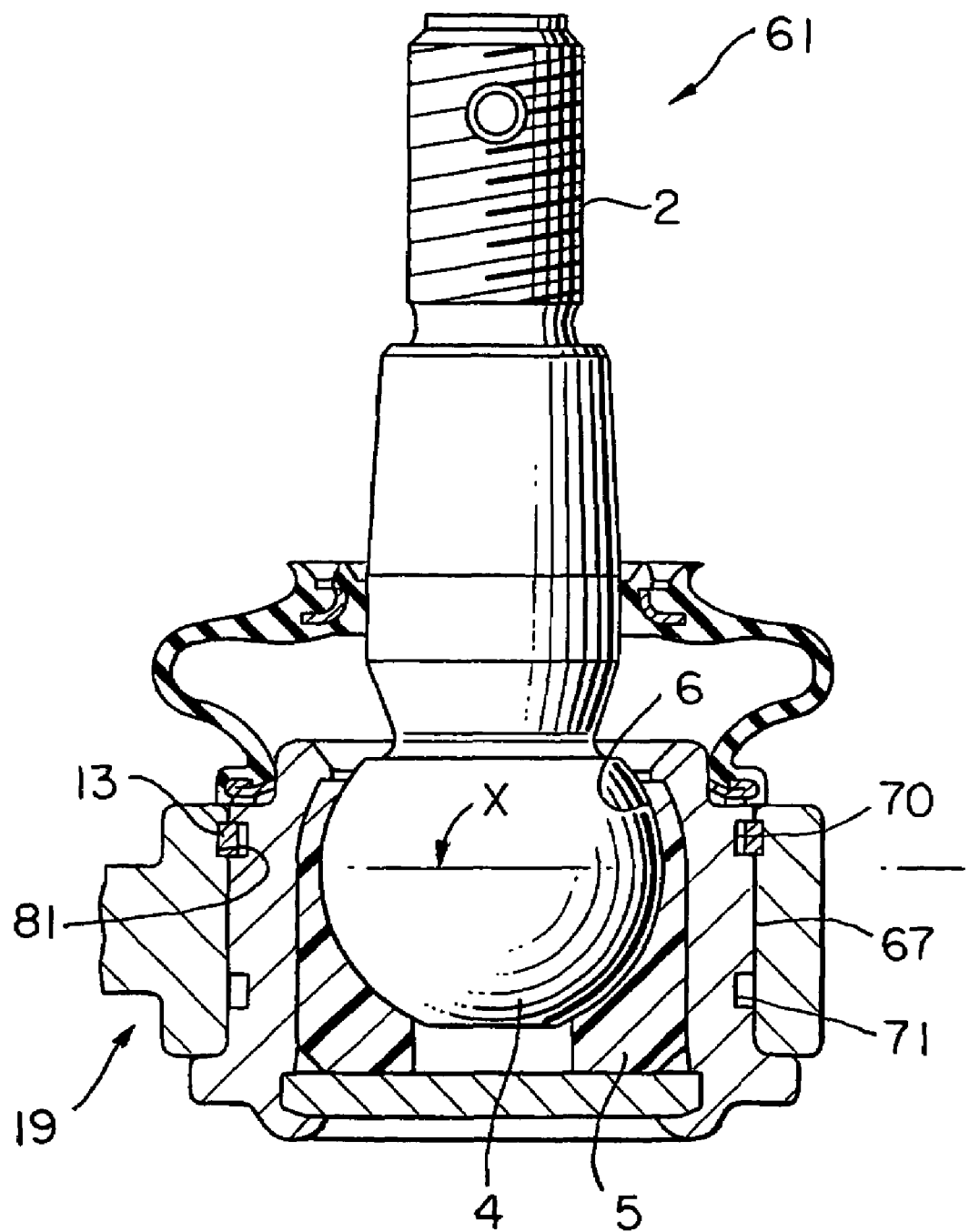
FIG. 8 is a partly sectional front elevation of a joint structure of a ball joint and an arm, according to a second embodiment of the present invention.

Next, a second embodiment of the present invention will be explained based on FIG. 8. The ball joint 61 shown in FIG. 8 has substantially the same structure as the ball joint 1 of the first embodiment, except for the shape of the housing 67.

The housing 67 shown in FIG. 8 has circumferential grooves 70, 71 in an outer-circumference surface thereof at respective positions above and below the equatorial plane X including a center of the spherical ball part 4 of the ball stud 2. The groove 70 is formed on the side of the open part 6 of the bearing 5, and a groove 81 of the hole 20 of the arm 19 is formed at a position opposite to the groove 70. In the same manner as the first embodiment, the retaining ring 13 is fitted to extend in the groove 71 of the housing 67 and in the groove 81 of the hole 20 of the arm 19.

In the joint structure of the ball joint 61 and the arm 19 of the embodiment, the grooves 71, 72 formed in the outer-circumference surface of the housing 67 weaken the press-fitting load from the hole 20 of the arm 19. Thus, a pressure given to the spherical ball part 4 of the ball stud 2 is inhibited so that a sliding characteristic of the ball stud 2 is improved. Specifically, an operational torque necessary for rocking the ball stud 2 can be reduced.

Figure 9:
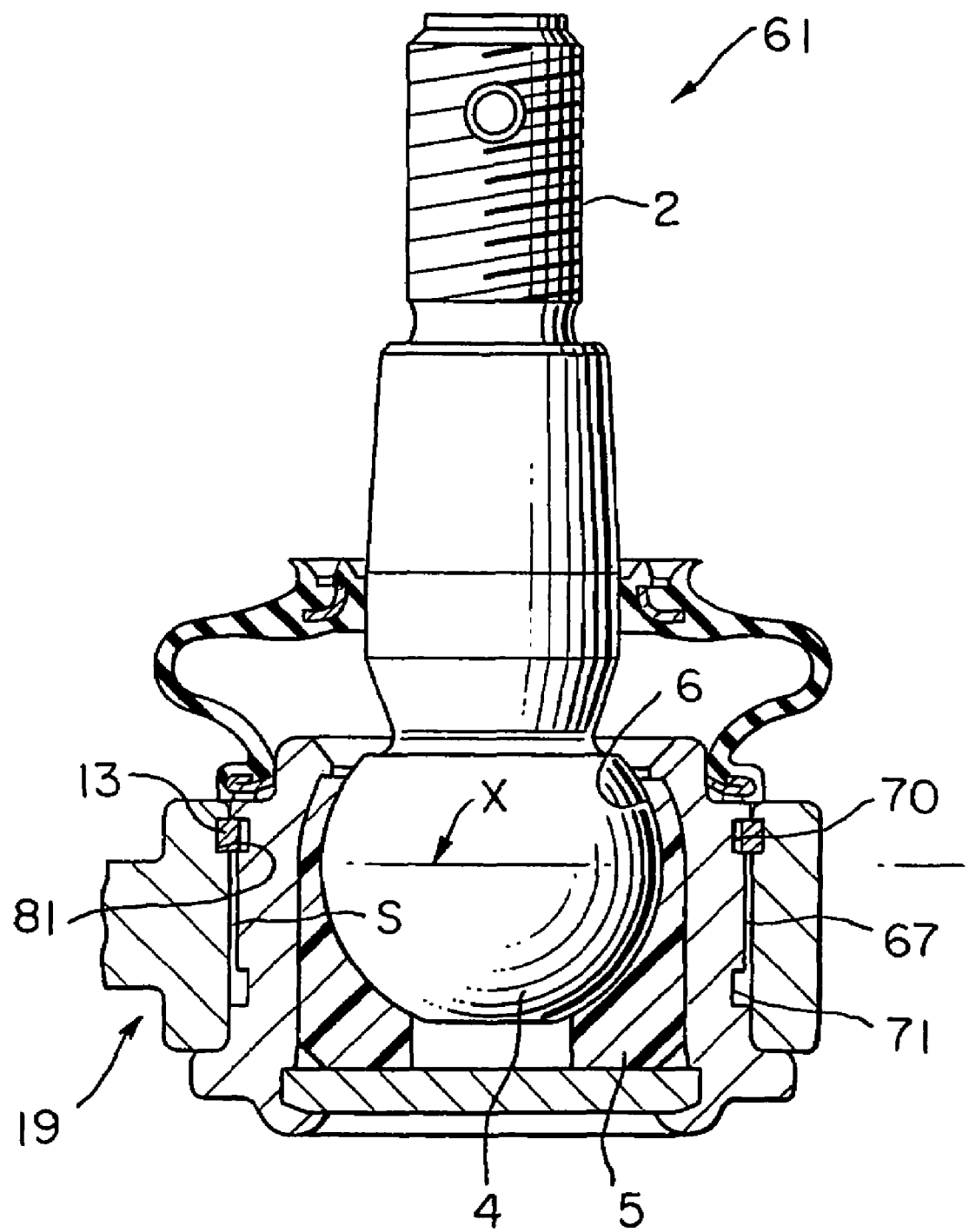
FIG. 9 is a partly sectional front elevation of a joint structure of a ball joint and an arm, wherein a gap S is formed.
Figure 10:
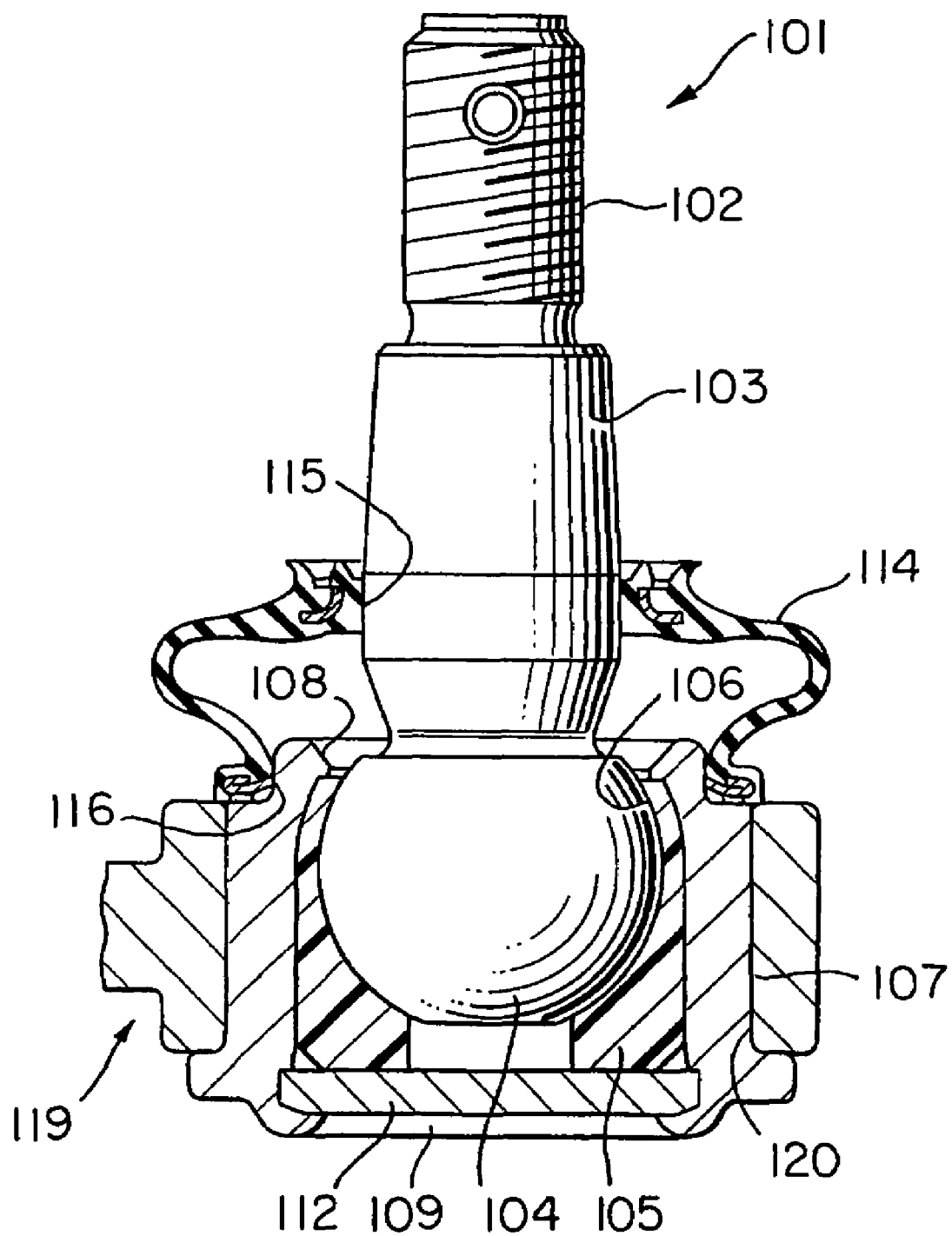
FIG. 10 is a partly sectional front elevation of a conventional joint structure of a ball joint and an arm.

In addition, it was found that it is preferable that the outer diameter of the housing 67 between the grooves 70 and 71 is formed to be a little smaller than the inner diameter of the hole 20 of the arm 19 to form a gap S, as shown in FIG. 9.

In the case, the grooves 71, 72 formed in the outer-circumference surface of the housing 67 and the gap S weaken the press-fitting load from the hole 20 of the arm 19. Thus, a pressure given to the spherical ball part 4 of the ball stud 2 is inhibited so that a sliding characteristic of the ball stud 2 is improved. Specifically, an operational torque necessary for rocking the ball stud 2 can be reduced.

Herein, in the joint structures of the ball joint and the arm of the respective embodiments, the retaining ring 13 is arranged between the groove of the housing and the groove 21 of the hole 20 of the arm 19. This is effective in retaining the joint of the housing and the arm 19. According to this arrangement of the retaining ring 13, it is unnecessary to extend a length of the housing in an axial direction, which can prevent size-expansion of the ball joint.

The invention claimed is:

1. A joint structure comprising:
   an arm having upper and lower surfaces;
   a ball joint including a ball stud having a spherical ball part and a shank part extending from the spherical ball part;
   a bearing cupping the spherical ball part of the ball stud;
   a housing holding the bearing therein; and press-fitting means for weakening a load by the arm after the housing is pressed into a hole of the arm; and
   wherein the press-fitting means is defined by two circumferential grooves in an outer-circumference surface of the housing of the ball joint and an outer diameter of the housing extending between the two grooves formed to be smaller than an inner diameter of the hole of the arm in such a manner that a gap is formed therebetween;
   the housing of the ball joint is adapted to be pressed into the hole of the arm; and
   the grooves and gap are located in a region between the upper and lower surfaces of the arm to inhibit pressure to the spherical ball part of the ball stud by reducing the sliding friction force on the ball stud.

2. A joint structure according to claim 1, wherein the two grooves are formed in such a manner that an equatorial plane of the ball part including a center of the spherical ball part is sandwiched between the two grooves.

3. A joint structure comprising:
   an arm having upper and lower surfaces;
   a ball joint including a ball stud having a spherical ball part and a shank part extending from the spherical ball part;
   a bearing cupping the spherical ball part of the ball stud;
   a housing holding the bearing therein; and press-fitting means for weakening a load by the arm after the housing is pressed into a hole of the arm; and
   wherein the press-fitting means is defined by two circumferential grooves in an outer-circumference surface of the housing of the ball joint and a second circumferential groove in an inner-circumference surface of the hole of the arm and an outer diameter of the housing extending between the two grooves formed to be smaller than an inner diameter of the hole of the arm in such a manner that a gap is formed therebetween;
   the housing of the ball joint is adapted to be pressed into the hole of the arm; and
   the grooves and gap are located in a region between the upper and lower surfaces of the arm to inhibit pressure to the spherical ball part of the ball stud by reducing the sliding friction force on the ball stud.

4. A Joint structure according to claim 3, wherein one of the first grooves and the second groove are arranged to be opposite to each other.

5. A joint structure according to claim 4, wherein the two first grooves are formed in such a manner that an equatorial plane of the ball part including a center of the spherical ball part is sandwiched between the first two grooves.

6. A joint structure according to claim 3, wherein the two first grooves are formed in such a manner that an equatorial plane of the ball part including a center of the spherical ball part is sandwiched between the two first grooves.

7. A joint structure according to claim 3, wherein an outer diameter of the housing between the two first grooves is formed to be smaller than an inner diameter of the hole of the in such a manner that a gap is formed therebetween.

* * * * *

UNITED STATES PATENT AND TRADEMARK OFFICE
CERTIFICATE OF CORRECTION

PATENT NO. : 7,510,344 B2  
APPLICATION NO. : 11/377606  
DATED : March 31, 2009  
INVENTOR(S) : Yasuhiro Kondoh Page 1 of 1

It is certified that error appears in the above-identified patent and that said Letters Patent is hereby corrected as shown below:

Title page item (73) Assignee: "Ushashi" should read -- Musashi --

Signed and Sealed this

Fourth Day of August, 2009

JOHN DOLL  
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,510,344 B2 | Page 1 of 1 |
| APPLICATION NO. | : 11/377606 | |
| DATED | : March 31, 2009 | |
| INVENTOR(S) | : Yasuhiro Kondoh | |

It is certified that error appears in the above-identified patent and that said Letters Patent is hereby corrected as shown below:

Title page (73) Assignee: after "Kabushiki" insert -- Kaisha --

Signed and Sealed this

Twenty-fifth Day of May, 2010

David J. Kappos
*Director of the United States Patent and Trademark Office*